(12) United States Patent
Endo

(10) Patent No.: US 8,570,616 B2
(45) Date of Patent: Oct. 29, 2013

(54) LIGHTING DEVICE, IMAGE READING DEVICE, AND IMAGE FORMING APPARATUS

(75) Inventor: Sasuke Endo, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 215 days.

(21) Appl. No.: 13/153,101

(22) Filed: Jun. 3, 2011

(65) Prior Publication Data

US 2011/0299140 A1 Dec. 8, 2011

Related U.S. Application Data

(60) Provisional application No. 61/351,742, filed on Jun. 4, 2010.

(51) Int. Cl.
*H04N 1/04* (2006.01)

(52) U.S. Cl.
USPC ............ 358/474; 358/509; 362/611; 362/617

(58) Field of Classification Search
USPC ................. 358/474, 482, 483, 484, 475, 509; 362/611, 606, 617, 615, 351
See application file for complete search history.

(56) References Cited

U.S. PATENT DOCUMENTS

| | | | |
|---|---|---|---|
| 6,744,033 B2 * | 6/2004 | Ikeda | 250/216 |
| 7,766,532 B2 * | 8/2010 | Ookawa et al. | 362/615 |
| 8,297,822 B2 * | 10/2012 | Lee et al. | 362/555 |
| 8,377,381 B2 * | 2/2013 | Dosmann et al. | 422/82.11 |
| 8,379,275 B2 * | 2/2013 | Tahk et al. | 358/475 |
| 2006/0056789 A1 * | 3/2006 | Saito et al. | 385/140 |
| 2009/0003016 A1 | 1/2009 | Ishimaru et al. | |
| 2009/0003784 A1 | 1/2009 | Kabuki et al. | |
| 2009/0073715 A1 | 3/2009 | Saito et al. | |
| 2009/0303732 A1 | 12/2009 | Ikeda | |
| 2010/0265551 A1 | 10/2010 | Endoh | |

FOREIGN PATENT DOCUMENTS

| | | |
|---|---|---|
| JP | 2004-320603 | 11/2004 |
| JP | 2005-295093 A | 10/2005 |
| JP | 2008-209634 A | 9/2008 |
| JP | 2008-270885 A | 11/2008 |

OTHER PUBLICATIONS

European Search Report dated Sep. 22, 2011, filed in European counterpart Application No. 11168471.8, 9 pages.

* cited by examiner

*Primary Examiner* — Negussie Worku

(74) *Attorney, Agent, or Firm* — Patterson & Sheridan, LLP

(57) ABSTRACT

According to one embodiment, a lighting device includes: a light source configured to generate light used for reading of an image; and a light guide configured to extend in a predetermined direction and lead light, which is irradiated from the light source, town image reading region, the light guide having, at an end in the predetermined direction, an incident region where the light irradiated from the light source is made incident and a cutting trace.

18 Claims, 12 Drawing Sheets

LIGHTING DEVICE, IMAGE READING DEVICE, AND IMAGE FORMING APPARATUS

CROSS-REFERENCE TO RELATED APPLICATION

This application is based upon and claims the benefit of priority from: U.S. provisional application 61/351742, filed on Jun. 4, 2010, the entire contents of which are incorporated herein by reference.

FIELD

Embodiments described herein relate generally to a lighting device, an image reading device, and an image forming apparatus.

BACKGROUND

In an image reading device used in a digital multifunction peripheral, in order to read an image for one line extending in a main scanning direction, linear light extending in the main scanning direction is irradiated from a light source to an original document and reflected light from the original document is condensed by a lens and made incident on an image sensor.

When the light of the light source is caused to reach the original document, in some case, a prism formed by a polyhedron is used. The prism can be formed by injection molding. When the injection molding is performed, a machining trace (a cutting trace) remains in a part of the prism. If the machining trace is present on an optical path from the light source to the original document, in some case, characteristics for lighting the original document are adversely affected.

DETAILED DESCRIPTION

In general, according to one embodiment, a lighting device includes: a light source configured to generate light used for reading of an image; and a light guide configured to extend in a predetermined direction and lead light, which is irradiated from the light source, to an image reading region, the light guide having, at an end in the predetermined direction, an incident region where the light irradiated from the light source is made incident and a cutting trace.

First Embodiment

Figure 1:
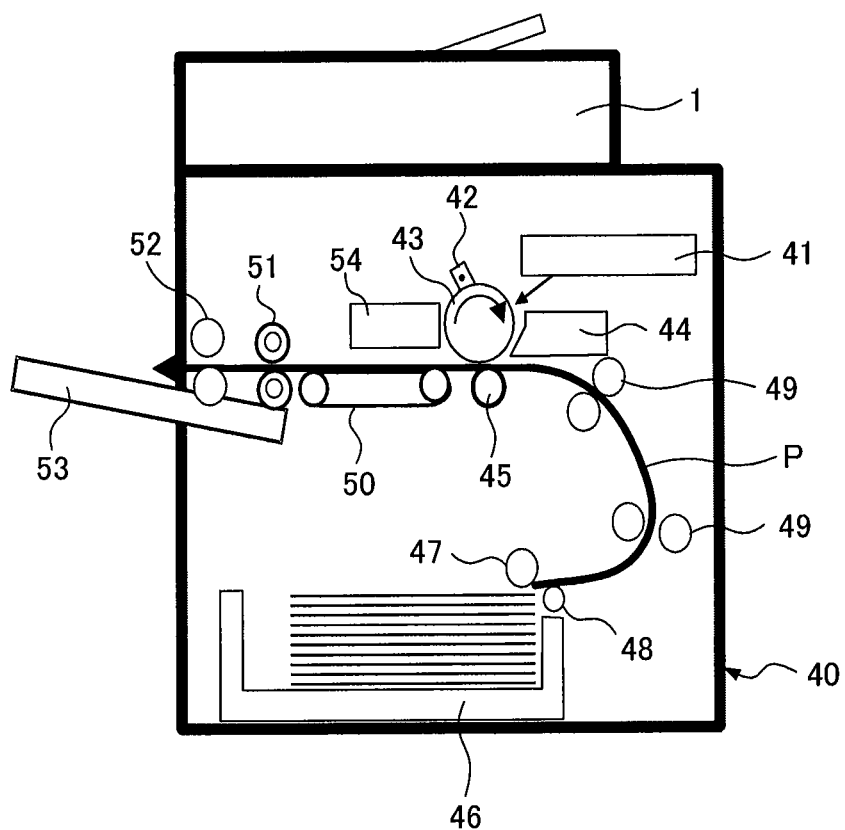
FIG. 1 is a diagram of the configuration of an image forming apparatus according to a first embodiment.

An image forming apparatus (MFP: Multi Function Peripheral) according to a first embodiment is explained with reference to FIG. 1. FIG. 1 is a schematic diagram of the internal structure of an image forming apparatus 40.

The image forming apparatus 40 includes a paper feeding cassette 46. The paper feeding cassette 46 stores plural sheets. A paper feeding roller 47 and a separation roller 48 separate the plural sheets stored in the paper feeding cassette 46 one by one and feed the sheet to a sheet conveying path P. The sheet conveying path P includes plural conveying rollers 49. An image is formed on the sheet while the sheet passes through the sheet conveying path P.

A charging device 42 charges the surface of a photoconductive drum 43. The photoconductive drum 43 rotates in a direction indicated by an arrow. A light scanning device 41 irradiates a laser beam on a photoconductive surface of the photoconductive drum 43 to thereby form an electrostatic latent image corresponding to image data on the photoconductive surface. Examples of the image data include image data transmitted from an external apparatus (e.g., a personal computer) to the image forming apparatus 40 and image data generated by a reading operation of an image reading device 1.

A developing device 44 supplies a toner to the surface of the photoconductive drum 43 and forms a toner image. A transfer device 45 transfers the toner image formed on the surface of the photoconductive drum 43 onto a sheet. A cleaning device 54 removes the toner remaining on the surface of the photoconductive drum 43.

In this embodiment, the toner image formed on the photoconductive drum 43 is transferred onto the sheet. However, the toner image formed on the photoconductive drum 43 can be transferred onto an intermediate transfer belt and then transferred from the intermediate transfer belt onto the sheet.

A conveying device 50 conveys the sheet having the toner image transferred thereon to a fixing device 51. The fixing device 51 heats the sheet to thereby fix the toner image on the sheet. A paper discharge roller 52 moves the sheet, which is received from the fixing device 51, to a tray 53. The sheet discharged from the paper discharge roller 52 is stacked on the tray 53.

The image reading device 1 scans an image of an original document to thereby generate image data. In this embodiment, the image reading device 1 is provided in the image forming apparatus 40 functioning as a digital multifunction peripheral. This embodiment can also be applied when the image reading device 1 is provided in an image forming apparatus functioning as a digital copying machine and when a product includes only the image reading device 1.

Figure 2:
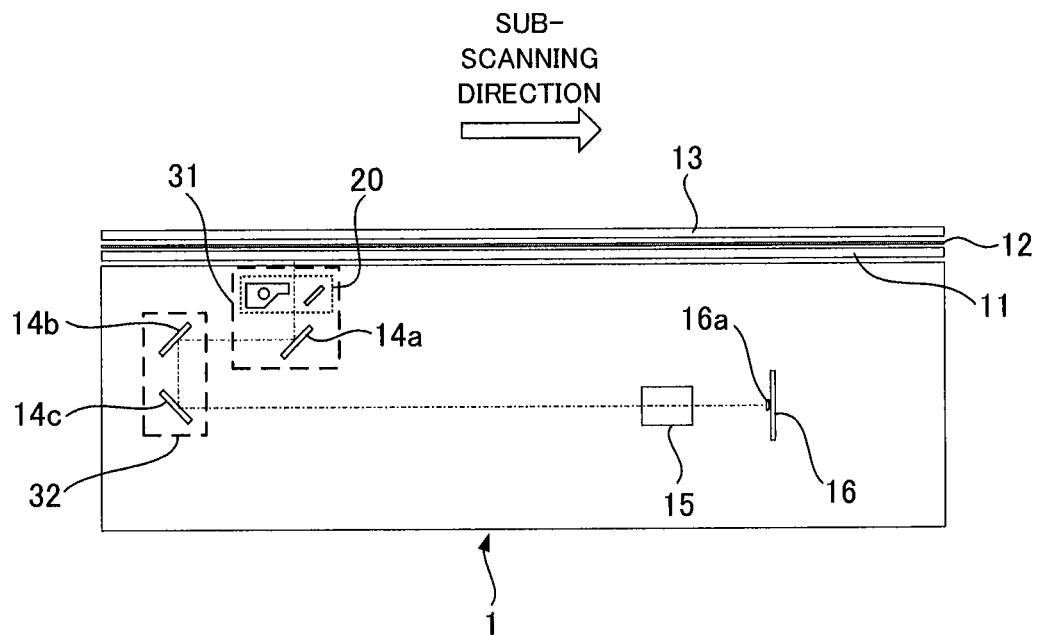
FIG. 2 is a sectional view of an image reading device according to the first embodiment.

The configuration of the image reading device 1 is explained with reference to FIG. 2. FIG. 2 is a sectional view of the image reading device 1 along a sub-scanning direction.

An original document 12 is placed on the upper surface of a platen glass 11. A reading surface of the original document 12 is opposed to the upper surface of the platen glass 11. A platen cover 13 can rotate with respect to a main body of the image reading device 1. The platen cover 13 moves between a position where the upper surface of the platen glass 11 is open and a position where the upper surface of the platen glass 11 is closed. The platen cover 13 is moved to the close position, whereby the original document 12 is pressed against the platen glass 11. The platen cover 13 can be provided in an ADF (Auto Document Feeder). The ADF automatically conveys the original document 12 to the image reading device 1.

A lighting device 20 irradiates illumination light on the original document 12. The lighting device 20 extends in a direction orthogonal to a paper surface of FIG. 2 (a main scanning direction) and irradiates linear illumination light extending in the main scanning direction. The linear illumination light reaches an image region of the original document 12 for one line extending in the main scanning direction.

The illumination light of the lighting device 20 is reflected on the original document 12. The reflected light from the original document 12 is reflected on return mirrors 14a, 14b, and 14c and travels to a focusing lens 15. The focusing lens 15 condenses the light reflected from the return mirror 14c and focuses the light on an image sensor 16. The image sensor 16 includes plural light receiving elements 16a arrayed in the direction orthogonal to the paper surface of FIG. 2. The plural light receiving elements 16a are arranged to correspond to linear illumination light and arranged to be capable of receiving the linear illumination light. The respective light receiving elements 16a output electric signals corresponding to an incident light amount by performing photoelectric conversion. As the image sensor 16, for example, a CCD (Charge Coupled Device) sensor can be used.

The reflected light from the original document 12 is made incident on the plural light receiving elements 16a, whereby an image region of the original document 12 for one line extending in the main scanning direction can be read.

A first carriage 31 supports the lighting device 20 and the return mirror 14a and moves in the sub-scanning direction. A second carriage 32 supports the return mirrors 14b and 14c and moves in the sub-scanning direction.

The first carriage 31 and the second carriage 32 relatively move each other in the sub-scanning direction and maintain optical path length from the surface (reflecting surface for illumination light) of the original document 12 to a focusing surface of the image sensor 16 constant.

For example, moving speeds in the sub-scanning direction in the first carriage 31 and the second carriage 32 can be set to a speed ratio of "2:1 (=first carriage 31:second carriage 32)". The first carriage 31 and the second carriage 32 move in the sub-scanning direction in synchronization with timing for reading an image in the image sensor 16 (a signal for controlling output of the image sensor 16).

The illumination light irradiated from the lighting device 20 can be scanned in the sub-scanning direction by moving the first carriage 31 and the second carriage 32. While the first carriage 31 and the second carriage 32 are moved in the sub-scanning direction, the image region of the original document 12 for one line extending in the main scanning direction is sequentially read. The entire surface of the original document 12 can be read by sequentially reading the image region for one line.

Figure 3:
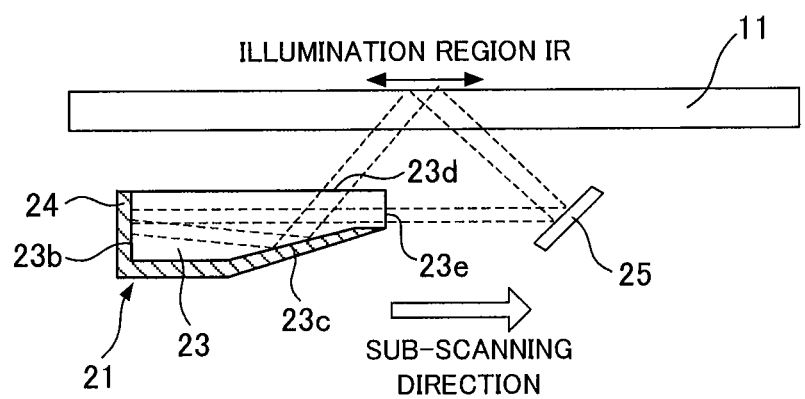
FIG. 3 is a sectional view of a lighting device according to the first embodiment.
Figure 4:
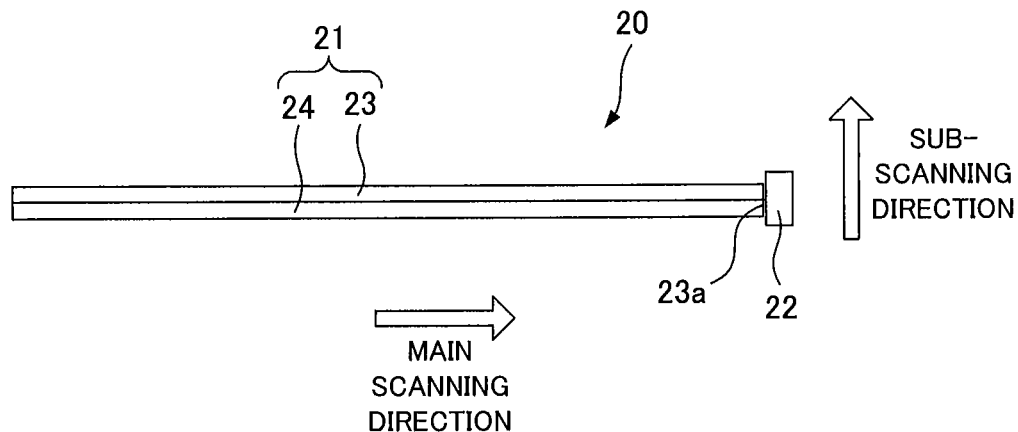
FIG. 4 is a top view of the lighting device.

The structure of the lighting device 20 is explained with reference to FIGS. 3 and 4. FIG. 3 is a sectional view of the lighting device 20 taken along a surface orthogonal to a longitudinal direction of the lighting device 20. FIG. 4 is a top view of a part of the lighting device 20 viewed from the side of the platen glass 11.

As shown in FIG. 4, the lighting device 20 includes a light guide 21 extending in the main scanning direction (a predetermined direction) and a light source 22 fixed to one end of the light guide 21. As the light source 22, for example, a light emitting diode (LED) can be used. One or plural light emitting diodes can be provided. The length of the light guide 21 in the main scanning direction corresponds to the length of the original document 12 in the main scanning direction.

The light guide 21 includes a light guide prism 23 and a case 24 configured to cover a part of the light guide prism 23. The light guide prism 23 can be formed of resin having high light transmittance such as acryl or polycarbonate or optical glass. The light guide prism 23 extends in the main scanning direction.

Illumination light irradiated from the light source 22 is made incident on the inside of the light guide prism 23 from one end face (an incident surface) 23a of the light guide prism in the main scanning direction and travels along a longitudinal direction of the light guide prism 23. The end face 23a is opposed to the light source 22 in the main scanning direction. The light made incident on the light guide prism 23 travels along the longitudinal direction of the light guide prism 23 while being reflected on the inside of the light guide prism 23.

As shown in FIG. 3, the case 24 covers a second surface 23b and a third surface 23c of the light guide prism 23. The light from the light source 22 is made incident on the light guide prism 23 and apart of the light is emitted to the outside of the light guide prism 23 from the second surface 23b and the third surface 23c. The light emitted from the second surface 23b and the third surface 23c is reflected on a surface of the case 24 facing the second surface 23b and the third surface 23c and then returns into the light guide prism 23.

The case 24 can be formed of a metal plate having high reflectance. As the metal plate, for example, an aluminum plate or a stainless steel plate can be used. The case 24 can be formed of white resin or reflective paint can be applied to the inner wall surface (a surface in contact with the light guide prism 23) of the case 24.

The case 24 only has to be capable of reflecting the light emitted to the outside from the light guide prism 23 and not advancing toward an illumination region IR. If the light that does not advance toward the illumination region IR causes performance problem of the lighting device 20, the case 24 can be omitted.

The second surface 23b extends in the longitudinal direction of the light guide prism 23 and has a reflecting region. The light made incident on the light guide prism 23 and reaching the reflecting region is diffused or reflected toward the third surface 23c and a fifth surface (an emission surface) 23e.

For example, the reflecting region is configured as minute concave-convex surface or formed by printing. The shape and the location of the reflecting region can be set as appropriate on the basis of a relation between a reflection characteristic of the reflecting region and the illumination region IR.

The second surface 23b can also be formed of a curved surface that is convex toward the outer side of the light guide prism 23. The shape of the second surface 23b can be set as appropriate on the basis of a relation between a reflection characteristic of the second surface 23b and an illumination region IR.

The illumination region IR is a region where the light irradiated from the lighting device 20 is irradiated. The illumination region IR corresponds to an image reading region. If a manufacturing error of the image reading device 1 and a shift of the illumination region involved in vibration or the like of the carriages 31 and 32 are taken into account, it is desirable to set the illumination region IR larger than the image reading region in order to stably perform lighting on the image reading region.

The third surface 23c tilts with respect to the sub-scanning direction. The light reflected on the third surface 23c passes through a fourth surface (an emission surface) 23d and reaches the platen glass 11. A part of the light reflected on the second surface 23b reaches the third surface 23c.

In this embodiment, the case 24 does not cover the fourth surface 23d and a fifth surface (an emission surface) 23e. However, the case 24 can also cover a part of the fourth surface 23d and the fifth surface 23e. The fourth surface 23d and the fifth surface 23e are surfaces through which light passes. However, a region off a region (an optical path) through which the light passes can be covered by the case 24. If the area covered by the case 24 is increased, components of the light reflected by the case 24 can be increased.

The fourth surface 23d and the fifth surface 23e can be formed of a plane or a curved surface (concave or convex surface). The shape of the fourth surface 23d and the fifth surface 23e can be set as appropriate on the basis of a relation between an optical characteristic of the light guide prism 23 due to the shape of the fourth surface 23d and the fifth surface 23e and the illumination region IR.

The light reflected on the inside of the light guide prism 23 is emitted to the outside of the light guide 21 from the fourth surface 23d and the fifth surface 23e. The fourth surface 23d is formed of a plane along the platen glass 11 and is opposed to the platen glass 11. The light emitted from the fourth surface 23d reaches the platen glass 11.

The fifth surface 23e is opposed to a reflection member 25 in the sub-scanning direction. A part of the light reflected on the second surface 23b passes through the fifth surface 23e and reaches the reflection member 25. The reflection member 25 reflects the light emitted from the light guide 21 (the fifth surface 23e) and guides the light to the platen glass 11.

A reflection surface of the reflection member 25 is formed of a glossy surface or reflective paint is applied to the reflection surface of the reflection member 25. This makes it possible to efficiently lead the light from the light guide 21 to the platen glass 11. The reflection surface of the reflection member 25 can be formed in a shape that satisfies a total reflection condition.

The light reflected by the reflection member 25 reaches the illumination region IR. The light from the reflection member 25 and the light from the fourth surface 23d of the light guide prism 23 overlap in the illumination region IR. Illumination lights from directions different from each other reach the platen glass 11.

The reflection surface of the reflection member 25 can be formed of a plane or can be formed of a curved surface (a concave surface or a convex surface). The shape of the reflection surface of the reflection member 25 can be set as appropriate on the basis of a relation between a reflection characteristic of the reflection member 25 and the illumination region IR.

The light guide 21 (including the light source 22) and the reflection member 25 are fixed in an aligned state on the inside of the lighting device 20. The light guide 21 and the reflection member 25 are arranged along the platen glass 11.

The reflected light from the original document 12 (the illumination region IR) passes through a space formed between the light guide 21 and the reflection member 25 and reaches the return mirror 14a.

Figure 5:
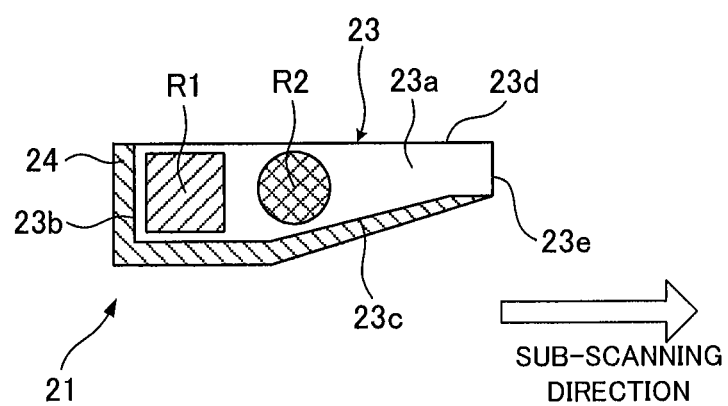
FIG. 5 is a side view of one end of a light guide in the first embodiment.

FIG. 5 is a diagram of the end face 23a of the light guide prism 23. A cutting trace R1 is formed on the end face 23a of the light guide prism 23. The cutting trace R1 is a trace remaining on the light guide prism 23 when injection molding is performed.

In the injection molding, the light guide prism 23 having predetermined shape can be molded by injecting a material forming the light guide prism 23 into a die. The material is injected into the inside of the die from a gate section. If the gate section is provided in a position corresponding to the end face 23a of the light guide prism 23, the material can be easily injected into the inside of the die. The material smoothly moves along the longitudinal direction of the light guide prism 23.

After the material is filled in the die and molded, an unnecessary portion remaining in the gate section is cut, whereby the light guide prism 23 having the predetermined shape is obtained. The cutting trace R1 is formed when the unnecessary portion remaining in the gate section is cut off.

The cutting trace R1 is present in a position different from an incident region R2. The incident region R2 is a region where the light irradiated from the light source 22 passes when the light is made incident on the end face 23a of the light guide prism 23. If the light source 22 is brought closest to the end face 23a of the light guide prism 23, the size of the incident region R2 is substantially equal to the size of a light emitting region of the light source 22. When the light source 22 from which emitted light expands is used, the size of the incident region R2 enlarges as the light source 22 is set further away from the end face 23a of the light guide prism 23.

The area of the end face 23a is larger than a sum of the area of the cutting trace R1 and the area of the incident region R2. The area of the cutting trace R1 and the area of the incident region R2 can be set as appropriate. In this embodiment, the positions of the cutting trace R1 and the incident region R2 are set in positions shown in FIG. 5. However, the positions of the cutting trace R1 and the incident region R2 can be set as appropriate. The cutting trace R1 and the incident region R2 only have to be present in positions not overlapping each other on the end face 23a.

The cutting trace R1 has concave and convex shapes larger than those of the other region (including the incident region R2) of the end face 23a. Specifically, the surface roughness of the cutting trace R1 is larger than the surface roughness in the other region of the end face 23a. As a parameter for specifying the surface roughness, arithmetic surface roughness Ra or ten point average roughness Rz can be used.

The case 24 can also cover the end face 23a of the light guide prism 23. Specifically, a region of the end face 23a excluding at least the incident region R2 can be covered by the case 24. Since the case 24 covers the end face 23a of the light guide prism 23, light made incident on the inside of the light guide prism 23 can be prevented from leaking to the outside of the light guide prism 23 from the end face 23a.

The cutting trace R1 can be prevented from being covered with the case 24. When the case 24 does not cover the cutting trace R1, the light made incident on the inside of the light guide prism 23 can pass through the cutting trace R1. In other words, the light reaching the cutting trace R1 on the inside of the light guide prism 23 passes through the cutting trace R1 and is emitted to the outside of the light guide 21.

Since the cutting trace R1 is formed by cutting during the injection molding, the cutting trace R1 has various shapes (traces). If the case 24 covers the cutting trace R1, it is likely that, when the light reflected on the case 24 passes through the cutting trace R1, the light travels in various directions and adversely affects illumination characteristics of the lighting device 20. If the case 24 does not cover the cutting trace R1, since the light reflected on the case 24 does not travel to the cutting trace R1, it is possible to suppress the light from adversely affecting the illumination characteristics of the lighting device 20.

According to this embodiment, since the cutting trace R1 is present in a position different from the incident region R2, it is possible to prevent the light irradiated from the light source 22 from passing through the cutting trace R1. If the light irradiated from the light source 22 passes through the cutting trace R1, it is likely that the light passing through the cutting trace R1 scatters and adversely affects the illumination characteristics of the lighting device 20. If the light irradiated from the light source 22 does not pass through the cutting trace R1, it is possible to prevent the light made incident on the light guide prism 23 from scattering.

If the cutting trace R1 is formed as a smooth surface by surface finishing (e.g., mirror polishing), it is possible to prevent scattering of the light by the cutting trace R1. However, if the surface finishing of the cutting trace R1 is performed, manufacturing steps for the light guide prism 23 increase or manufacturing cost for the light guide prism 23 increases. In this embodiment, the cutting trace R1 is left on the light guide prism 23 and it is unnecessary to subject the cutting trace R1 to the surface finishing.

Figure 6A:
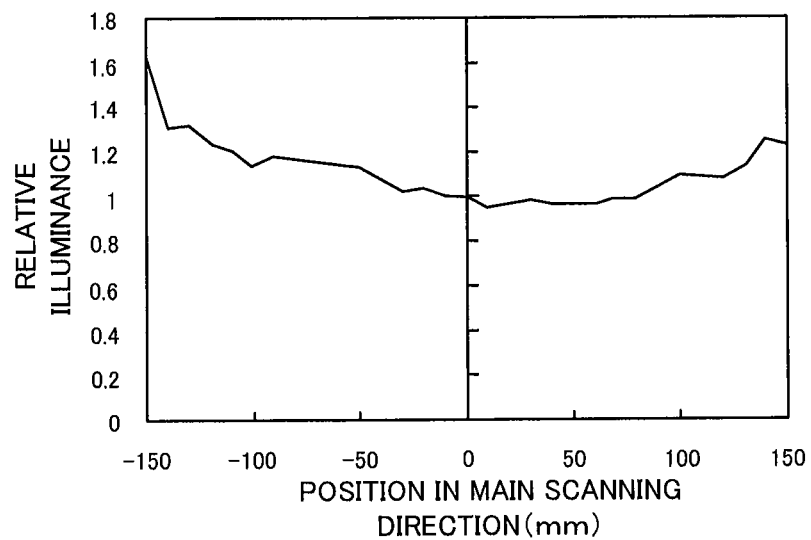
FIG. 6A is a graph of an illuminance distribution of a lighting device that is a first comparison target compared with the first embodiment.
Figure 6B:
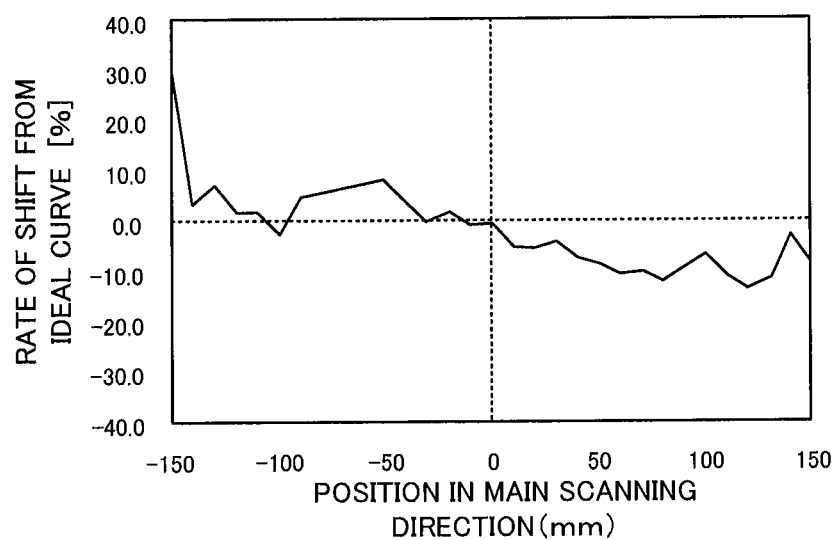
FIG. 6B is a graph of a shift from an ideal illuminance distribution in the first comparison target.

FIGS. 6A and 6B are graphs of illumination characteristics of a lighting device (a first comparison target) obtained when the cutting trace R1 is not subjected to the mirror polishing. In the lighting device 20 having the illumination characteristics shown in FIGS. 6A and 6B, a part of light made incident on the light guide prism 23 from the light source 22 passes through the cutting trace R1.

FIG. 6A is a graph of a relation between a position in the main scanning direction and relative illuminance. FIG. 6B is a graph of a shift between an illuminance distribution shown in FIG. 6A and an ideal illuminance distribution. In FIG. 6B, the ordinate indicates a rate of the shift and the abscissa indicates a position in the main scanning direction.

The ideal illuminance distribution is an illuminance distribution set in advance. In this embodiment, the ideal illuminance distribution is an illuminance distribution shown in FIG. 7. The ideal illuminance distribution is different according to characteristics of the lighting device 20.

Figure 7:
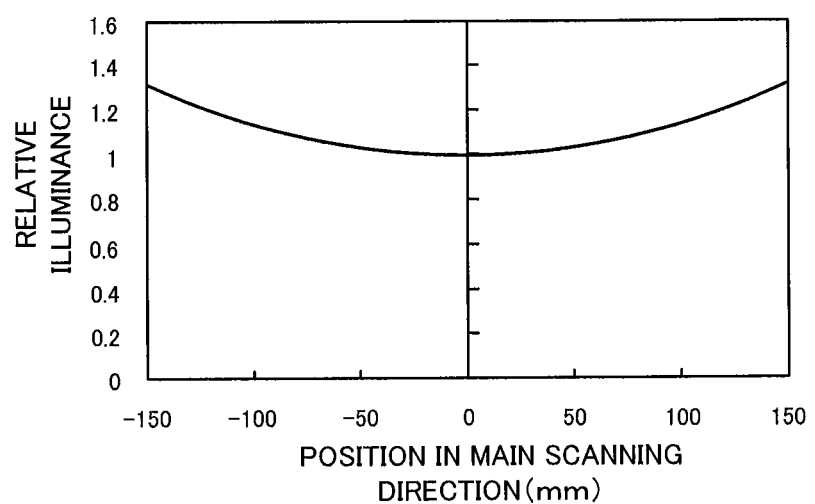
FIG. 7 is a graph of the ideal illuminance distribution.

In the illuminance distribution shown in FIG. 7, relative illuminance is increased further away from a center position (a position of 0) in the main scanning direction. As characteristics of the focusing lens 15, an amount of light reaching the image sensor 16 tends to decrease further away from the center of the lens. In this embodiment, fluctuation in an amount of light reaching the image sensor 16 is suppressed by setting an illuminance distribution to the illuminance distribution shown in FIG. 7. In FIG. 7, the center position is equivalent to the center of the lens.

Figure 8A:
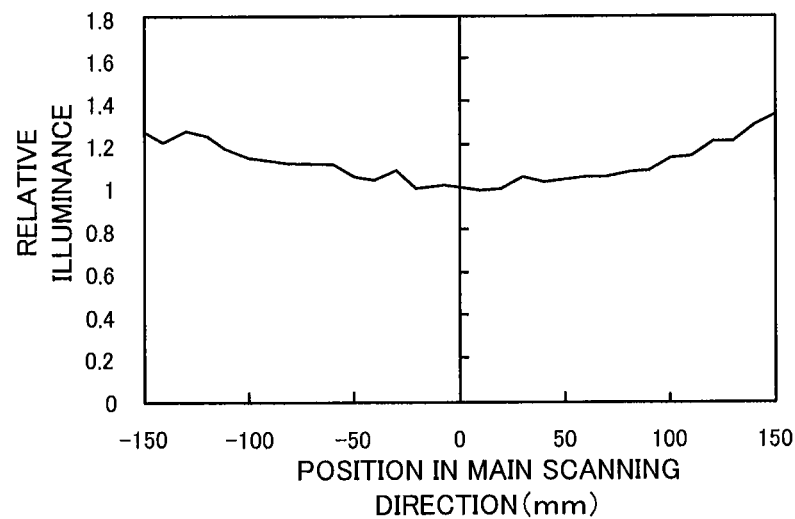
FIG. 8A is a graph of an illuminance distribution of a lighting device that is a second comparison target compared with the first embodiment.
Figure 8B:
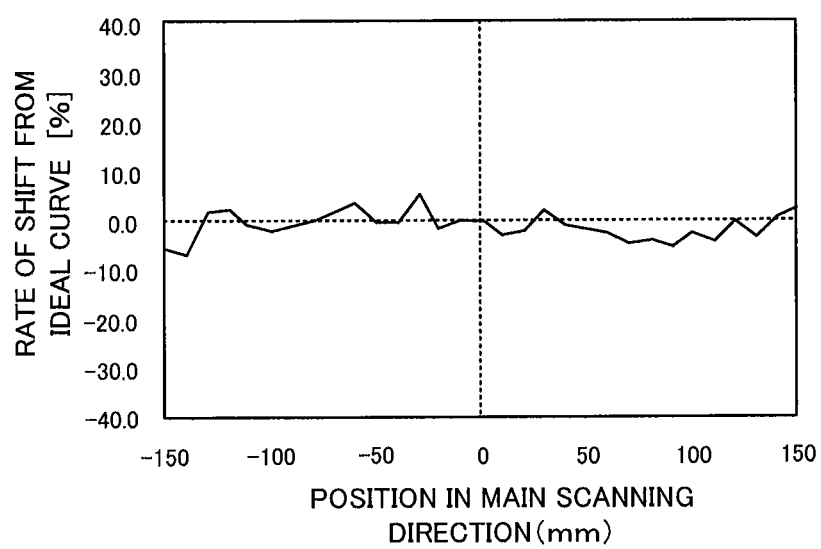
FIG. 8B is a graph of a shift from the ideal illuminance distribution in the second comparison target.

FIGS. 8A and 8B are graphs of illumination characteristics of a lighting device (a second comparisons target) obtained when the cutting trace R1 is subjected to the mirror polishing.

FIG. 8A is a graph of a relation between a position in the main scanning direction and relative illuminance. FIG. 8B is a graph of a shift between an illuminance distribution shown in FIG. 8A and the ideal illuminance distribution. In FIG. 8B, the ordinate indicates a rate of the shift and the abscissa indicates a position in the main scanning direction.

In the lighting device 20 having the illumination characteristics shown in FIGS. 8A and 8B, light irradiated from the light source 22 is made incident even on a portion where the cutting trace R1 is subjected to the mirror polishing.

Figure 9A:
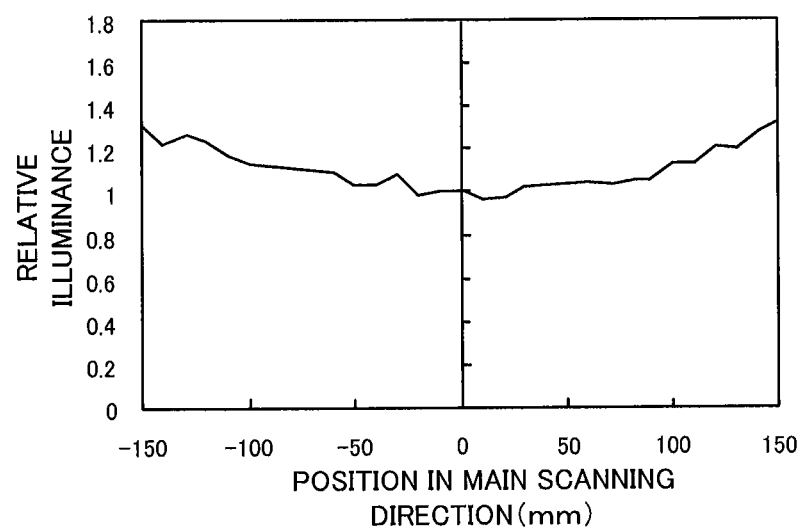
FIG. 9A is a graph of an illuminance distribution of the lighting device.
Figure 9B:
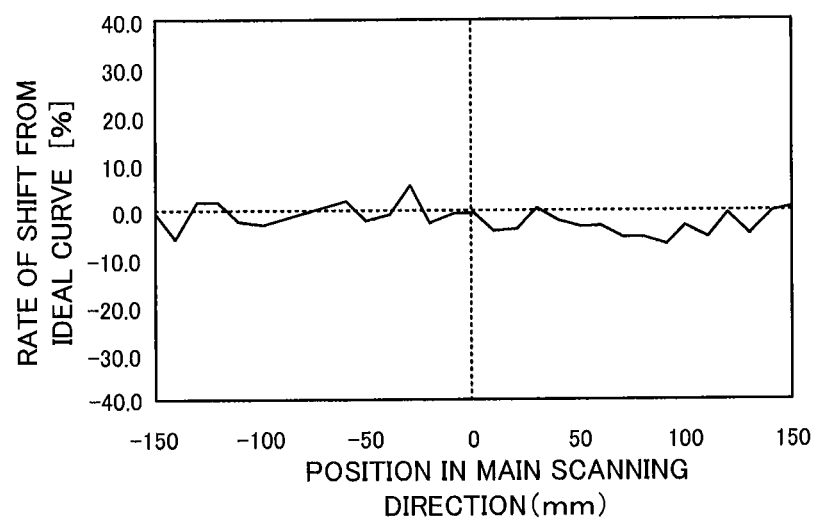
FIG. 9B is a graph of a shift from the ideal illuminance distribution in the first embodiment.

FIGS. 9A and 9B are graphs of illumination characteristics of the lighting device 20 according to this embodiment. In the lighting device 20 according to this embodiment, the cutting trace R1 is not subjected to the mirror polishing and light made incident on the light guide prism 23 from the light source 22 does not pass through the cutting trace R1.

FIG. 9A is a graph of a relation between a position in the main scanning direction and relative illuminance. FIG. 9B is a graph of a shift between an illuminance distribution shown in FIG. 9A and the ideal illuminance distribution. In FIG. 9B, the ordinate indicates a rate of the shift and the abscissa indicates a position in the main scanning direction.

As it is seen from FIGS. 8A and 9A, the lighting device 20 according to this embodiment can obtain an illuminance distribution equivalent to that of the lighting device 20 in which the cutting trace R1 is subjected to the mirror polishing.

As it is seen from FIGS. 8B and 9B, the shift from the ideal illuminance distribution is also the same. On the other hand, in the lighting device 20 in which the light irradiated from the light source 22 passes through the cutting trace R1, as shown in FIGS. 6A and 6B, an illuminance distribution substantially shifts from the ideal illuminance distribution.

In this embodiment, the light source 22 is arranged at one end of the light guide 21 in the main scanning direction. However, a pair of the light sources 22 can be arranged at both ends of the light guide 21 in the main scanning direction. If the light sources 22 are arranged at both the ends of the light guide 21, it is easy to secure a light amount of the lighting device 20.

In this embodiment, the light irradiated from the light source 22 is guided to the illumination region IR using the light guide 21 and the reflection member 25. However, the reflection member 25 can be omitted and the light guide 21 alone can be used. If the light guide 21 alone is used, the light made incident on the light guide 21 from the light source 22 is reflected on the inside of the light guide 21 and guided to the illumination region IR. A surface forming the light guide prism 23 (a reflection surface or an emission surface) can be set as appropriate.

In this embodiment, the reflected light from the original document 12 is guided to the image sensor 16 using the return mirrors 14a to 14c and the focusing lens 15. However, the return mirrors 14a to 14c can be omitted and the reflected light from the original document 12 can be guided to the image sensor 16 using the focusing lens 15. If the focusing lens 15 is used alone, the positions of the focusing lens 15 and the image sensor 16 only have to be changed.

Second Embodiment

In the first embodiment, the cutting trace R1 is formed at one end of the light guide prism 23 in the main scanning direction. Ina second embodiment, a pair of the cutting traces R1 are formed at both ends of the light guide prism 23 in the main scanning direction.

Figure 10:
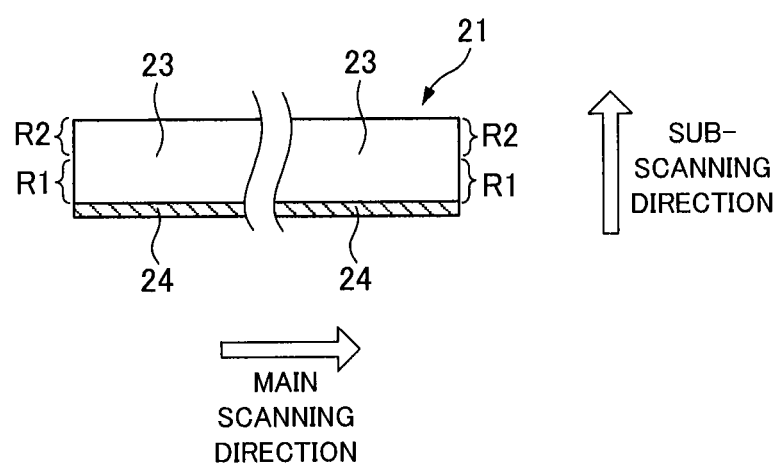
FIG. 10 is a schematic top view of a light guide in a second embodiment.

FIG. 10 is a top view of the light guide prism 23 in this embodiment viewed from the side of the platen glass 11. As shown in FIG. 10, the two cutting traces R1 formed at both the ends of the light guide prism 23 are opposed to each other in the longitudinal direction of the light guide prism 23 (the main scanning direction).

A pair of the light sources 22 are respectively arranged at both the ends of the light guide prism 23 in the main scanning direction. Light irradiated from one light source 22 is made incident on the inside of the light guide prism 23 from the incident region R2 formed at one end of the light guide prism 23. Light irradiated from the other light source 22 is made incident on the inside of the light guide prism 23 from the incident region R2 formed at the other end of the light guide prism 23.

As shown in FIG. 10, the cutting traces R1 and the incident regions R2 are provided in symmetrical positions at both the ends of the light guide prism 23 in the main scanning direction. This makes it possible to suppress fluctuation in an illuminance distribution of the lighting device 20. In other words, the light guide prism 23 has a symmetrical structure with respect to the center of the light guide prism 23 in the main scanning direction. Therefore, an illuminance distribution in the main scanning direction can also be formed as a symmetrical distribution.

Figure 11A:
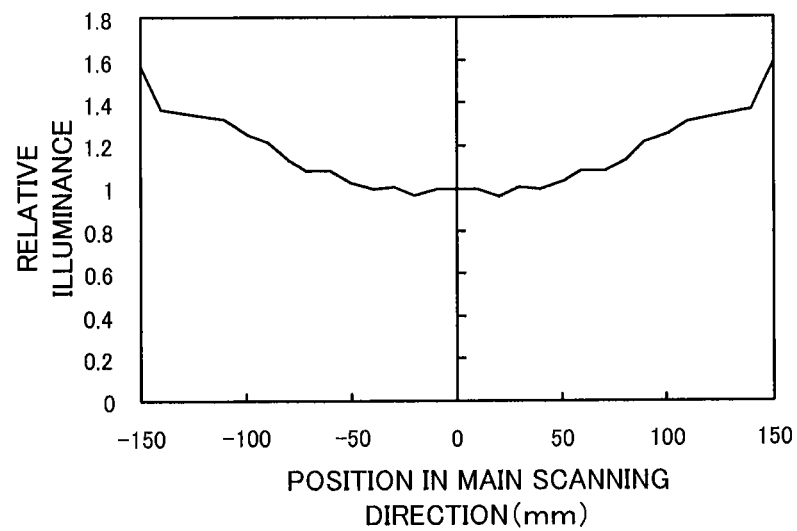
FIG. 11A is a graph of an illuminance distribution of a lighting device that is a first comparison target compared with the second embodiment.
Figure 11B:
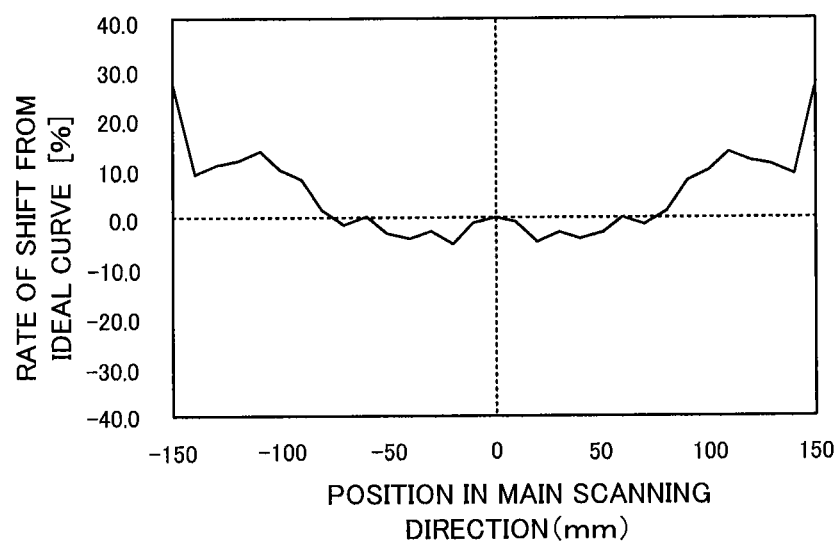
FIG. 11B is a graph of a shift from an ideal illuminance distribution in the first comparison target.

FIGS. 11A and 11B are graphs of illumination characteristics of a lighting device (a first comparison target) obtained when the two cutting traces R1 are not subjected to the mirror polishing. In the lighting device 20 having the illumination characteristics shown in FIGS. 11A and 11B, a part of lights made incident on the light guide prism 23 from the light sources 22 pass through the respective cutting traces R1.

FIG. 11A is a graph of a relation between a position in the main scanning direction and relative illuminance. FIG. 11B is a graph of a shift between an illuminance distribution shown in FIG. 11A and an ideal illuminance distribution. In FIG. 11B, the ordinate indicates a rate of the shift and the abscissa indicates a position in the main scanning direction. In this embodiment, as in the first embodiment, the ideal illuminance distribution is the illuminance distribution shown in FIG. 7.

Figure 12A:
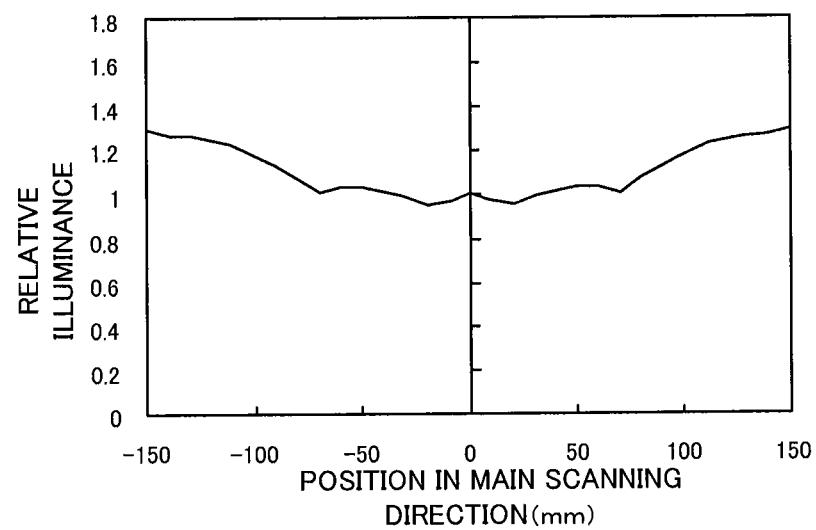
FIG. 12A is a graph of an illuminance distribution of a lighting device that is a second comparison target compared with the second embodiment.
Figure 12B:
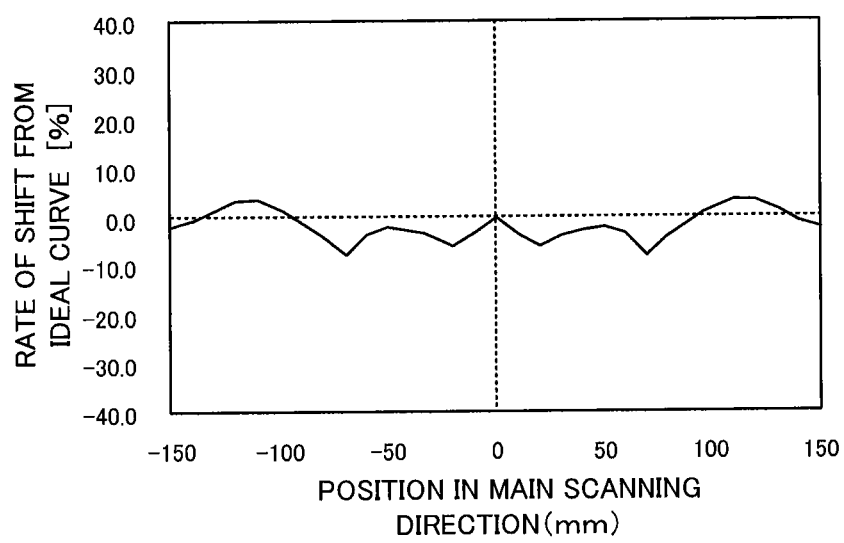
FIG. 12B is a graph of a shift from the ideal illuminance distribution in the second comparison target.

FIGS. 12A and 12B are graphs of illumination characteristics of a lighting device (a second comparison target) obtained when the two cutting traces R1 are subjected to the mirror polishing. FIG. 12A is a diagram of a relation between a position in the main scanning direction and relative illuminance. FIG. 12B is a graph of a shift between an illuminance distribution shown in FIG. 12A and the ideal illuminance distribution. In FIG. 12B, the ordinate indicates a rate of the shift and the abscissa indicates a position in the main scanning direction.

Figure 13A:
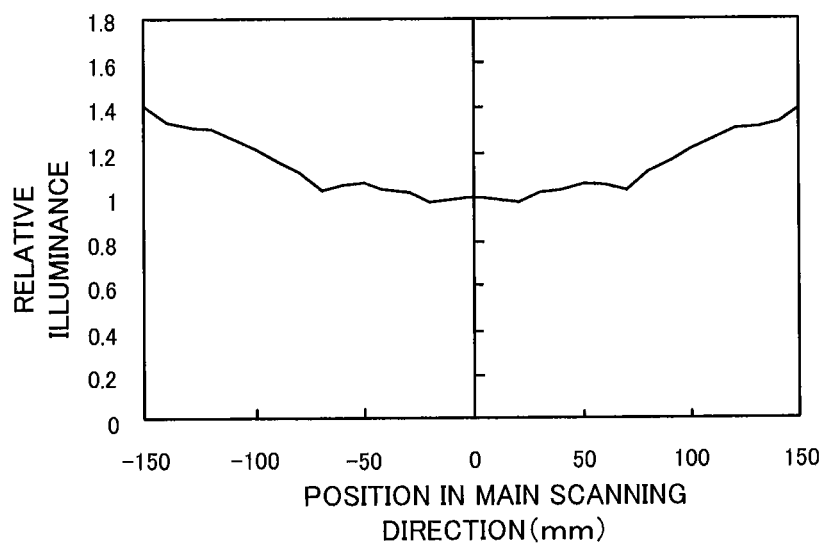
FIG. 13A is a graph of an illuminance distribution of a lighting device according to the second embodiment.
Figure 13B:
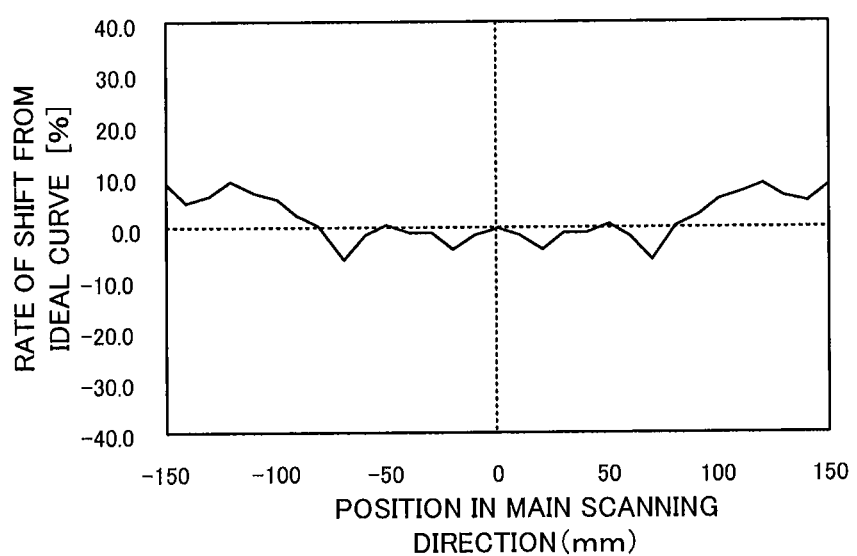
FIG. 13B is a graph of a shift from the ideal illuminance distribution in the second embodiment.

FIGS. 13A and 13B are graphs of illumination characteristics of the lighting device 20 according to this embodiment. In the lighting device 20 according to this embodiment, the two cutting traces R1 are not subjected to the mirror polishing and lights made incident on the light guide prism 23 from the respective light sources 22 do not pass the respective cutting traces R1.

FIG. 13A is a graph of a relation between a position in the main scanning direction and relative illuminance. FIG. 13B is a graph of a shift between an illuminance distribution shown in FIG. 13A and the ideal illuminance distribution. In FIG. 13B, the ordinate indicates a rate of the shift and the abscissa indicates a position in the main scanning direction.

As it is seen from FIGS. 12A and 13A, the lighting device 20 according to this embodiment can obtain an illuminance distribution equivalent to that of the lighting device 20 in which the cutting trace R1 is subjected to the mirror polishing. As it is seen from FIGS. 12B and 13B, the shift from the ideal illuminance distribution is also the same. On the other hand, in the lighting device 20 in which the lights from the respective light sources 22 pass through the respective cutting traces R1, as shown in FIGS. 11A and 11B, an illuminance distribution substantially shifts from the ideal illuminance distribution.

Third Embodiment

In the first embodiment, the cutting trace R1 and the incident region R2 are formed in the same plane of the end face 23a. In other words, the cutting trace R1 and the incident region R2 are provided in the same position in the main scanning direction. On the other hand, in a third embodiment, the cutting trace R1 and the incident region R2 are provided in positions different from each other in the main scanning direction.

Figure 14:
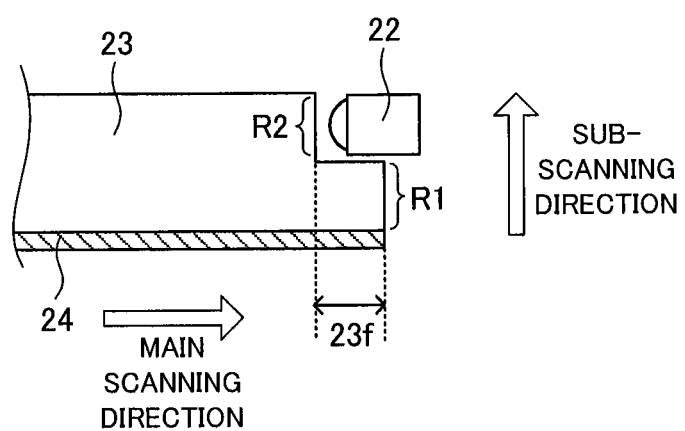
FIG. 14 is a schematic top view of a light guide in a third embodiment.

FIG. 14 is a diagram of an example of the light guide prism 23 in this embodiment. FIG. 14 is a schematic diagram of one end of the light guide prism 23 in the main scanning direction.

The light guide prism 23 has a projecting section 23$f$ at one end in the main scanning direction. The projecting section 23$f$ extends in the main scanning direction. The cutting trace R1 is formed at the distal end of the projecting section 23$f$.

The light source 22 is arranged in a position adjacent to the projecting section 23$f$ in the sub-scanning direction. The light source 22 does not have to be arranged in the position adjacent to the projecting section 23$f$. Light irradiated from the light source 22 passes through the incident region R2 and is made incident on the inside of the light guide prism 23.

In FIG. 14, the projecting section 23$f$ is provided at one end of the light guide prism 23 in the main scanning direction. However, a pair of the projecting sections 23$f$ can be provided at both the ends of the light guide prism 23 in the main scanning direction. If the projecting sections 23$f$ are provided at both the ends of the light guide prism 23, it is desirable that the two projecting sections 23$f$ are located on a straight line extending in the main scanning direction. In other words, the two projecting sections 23$f$ only have to have a relation same as the relation between the positions of the two cutting traces R1 explained with reference to FIG. 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

What is claimed is:

1. A lighting device comprising:
   a light source configured to generate light used for reading an image; and
   a light guide extending in a predetermined direction and configured to guide the light irradiated from the light source to an image reading region, the light guide having an incident region, on which the light irradiated from the light source is incident, and a cutting trace, the incident region and the cutting trace being located in different regions of an end face of the light guide in the predetermined direction.

2. The device according to claim 1, wherein the light guide includes:
   a reflection surface from which the light incident on the incident region is reflected; and
   an emission surface through which the light reflected from the reflection surface exits the light guide.

3. The device according to claim 1, wherein
the light guide is configured to guide a part of the light irradiated from the light source in a direction different from a direction of the image reading region, and
the device further comprises a reflection member configured to reflect the part of the light, after the part of the light exits the light guide, in the direction of the image reading region.

4. The device according to claim 1, wherein each end face of the light guide in the predetermined direction has a cutting trace thereon.

5. The device according to claim 4, wherein the cutting traces are opposite to each other in the predetermined direction.

6. The device according to claim 1, wherein a pair of the light sources are provided at both ends of the light guide in the predetermined direction.

7. The device according to claim 1, wherein surface roughness of the cutting trace is larger than surface roughness in the other regions of the light guide.

8. The device according to claim 1, wherein the light guide includes:
a prism; and
a case configured to cover a part of the prism and reflect the light.

9. The device according to claim 8, wherein the case covers a region different from the region where the cutting trace is located.

10. The device according to claim 1, wherein the light guide is a prism.

11. The device according to claim 1, wherein the light guide is an injection-molded body.

12. The device according to claim 11, wherein the region at which the cutting trace is located corresponds to a position of a gate section used during manufacturing of the light guide by injection molding.

13. An image reading device comprising:
a light source configured to generate light used for reading of an image;
a light guide extending in a predetermined direction and configured to guide the light irradiated from the light source to an image reading region, the light guide having an incident region, on which the light irradiated from the light source is incident, and a cutting trace, the incident region and the cutting trace being located at different regions of an end face of the light guide in the predetermined direction; and
an image sensor configured to receive the light reflected from the image reading region and convert the received light to an electric signal.

14. The device according to claim 13, further comprising an optical system configured to guide the light reflected from the image reading region to the image sensor.

15. The device according to claim 14, wherein the optical system is a lens array configured to condense the light reflected from the image reading region and cause the light to be incident on the image sensor.

16. The device according to claim 14, wherein the optical system includes:
plural mirrors configured to guide the light reflected from the image reading region to the image sensor; and
a lens configured to focus the light reflected from the plural mirrors on the image sensor.

17. An image forming apparatus comprising:
a light source configured to generate light used for reading of an image;
a light guide extending in a predetermined direction and configured to guide the light irradiated from the light source to an image reading region, the light guide having an incident region, on which the light irradiated from the light source is incident, and a cutting trace, the incident region and the cutting trace being located at different regions of an end face of the light guide in the predetermined direction;
an image sensor configured to receive the light reflected from the image and convert the received light to an electric signal; and
an image forming section configured to form the image on a sheet on the basis of the electric signal obtained from the image sensor.

18. An image reading method comprising:
generating light to be used for reading an image;
directing the light to be incident on an end face of a light guide extending in a predetermined direction at a region of the end face different from a region of the end face where a cutting trace is located;
directing the light exiting the light guide to an image reading region;
directing the light reflected from the image reading region to an image sensor; and
generating at the image sensor a signal from the light reflected from the image reading region.

* * * * *

UNITED STATES PATENT AND TRADEMARK OFFICE
CERTIFICATE OF CORRECTION

| | | |
|---|---|---|
| PATENT NO. | : 8,570,616 B2 | Page 1 of 1 |
| APPLICATION NO. | : 13/153101 | |
| DATED | : October 29, 2013 | |
| INVENTOR(S) | : Sasuke Endo | |

It is certified that error appears in the above-identified patent and that said Letters Patent is hereby corrected as shown below:

On the title page, on Item (57) the Abstract, line 5, please delete "town" and insert --to an--

Signed and Sealed this
Twenty-seventh Day of May, 2014

Michelle K. Lee
*Deputy Director of the United States Patent and Trademark Office*